United States Patent
Li et al.

(10) Patent No.: US 11,220,167 B2
(45) Date of Patent: *Jan. 11, 2022

(54) ELECTRIC MINING DUMP TRUCK

(71) Applicant: BYD Company Limited, Shenzhen (CN)

(72) Inventors: Long Li, Shenzhen (CN); Yingjie Wang, Shenzhen (CN); Hongming Pan, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 579 days.

This patent is subject to a terminal disclaimer.

(21) Appl. No.: 16/314,296

(22) PCT Filed: May 9, 2017

(86) PCT No.: PCT/CN2017/083651
§ 371 (c)(1),
(2) Date: Dec. 28, 2018

(87) PCT Pub. No.: WO2018/000944
PCT Pub. Date: Jan. 4, 2018

(65) Prior Publication Data
US 2021/0229583 A1 Jul. 29, 2021

(30) Foreign Application Priority Data

Jun. 29, 2016 (CN) .......................... 201610496246.1

(51) Int. Cl.
*B60K 1/04* (2019.01)
*B60K 1/00* (2006.01)
(Continued)

(52) U.S. Cl.
CPC .................. *B60K 1/00* (2013.01); *B60K 1/04* (2013.01); *B60L 50/60* (2019.02); *B60P 1/04* (2013.01);
(Continued)

(58) Field of Classification Search
CPC .... B60K 1/00; B60K 1/04; B60K 2001/0405; B60P 1/04; F04B 15/02; F04B 53/08; F04D 13/06; F04C 2240/40
See application file for complete search history.

(56) References Cited

U.S. PATENT DOCUMENTS 6,086,076 A * 7/2000 Prem ........................ B60G 9/02
280/124.111
6,127,964 A * 10/2000 Kageyama ............ G01S 7/4004
342/70

(Continued)

FOREIGN PATENT DOCUMENTS

CN 202986858 U 6/2013
CN 103738194 A 4/2014
(Continued)

OTHER PUBLICATIONS

English Translation of International Search Report from PCT/CN2017/083651 dated Aug. 11, 2017 (2 pages).

*Primary Examiner* — Erez Gurari
(74) *Attorney, Agent, or Firm* — Calfee Halter & Griswold LLP

(57) ABSTRACT

An electric mining dump truck includes a frame, an axle, an electric wheel assembly, a power battery assembly, an electric control system, a hydraulic system, a cooling system, a bed and a cab assembly. The cab assembly is disposed on a front end of the frame, and the bed is mounted on a rear end of the frame; the axle includes a front axle and a rear axle, the front axle and the rear axle is mounted on the front end and the rear end of the frame, respectively, the electric wheel (Continued)

assembly is mounted on the rear axle; and the power battery assembly includes a battery cabinet configured to supply electric energy for various electric components.

8 Claims, 2 Drawing Sheets

(51) Int. Cl.
*B60L 50/60* (2019.01)
*B60P 1/04* (2006.01)
*F04B 15/02* (2006.01)
*F04B 53/08* (2006.01)
*F04C 13/00* (2006.01)
*F04D 13/06* (2006.01)
*F04D 29/58* (2006.01)
*F15B 11/17* (2006.01)

(52) U.S. Cl.
CPC .............. *F04B 15/02* (2013.01); *F04B 53/08* (2013.01); *F04C 13/002* (2013.01); *F04D 13/06* (2013.01); *F04D 29/5866* (2013.01); *F15B 11/17* (2013.01); *B60K 2001/0405* (2013.01); *F04C 2240/40* (2013.01)

(56) References Cited

U.S. PATENT DOCUMENTS

| | | | |
|---|---|---|---|
| 2010/0119184 A1* | 5/2010 | Shibukawa | F16C 33/6659 384/462 |
| 2010/0187044 A1* | 7/2010 | Nabeshima | B60B 11/06 184/26 |
| 2010/0307846 A1* | 12/2010 | Kvist | B62D 53/005 180/65.22 |
| 2012/0217074 A1 | 8/2012 | Rudinec | |
| 2013/0056289 A1* | 3/2013 | Shibukawa | B60T 1/062 180/62 |
| 2013/0075170 A1* | 3/2013 | Minoshima | B60L 50/13 180/65.1 |
| 2014/0347483 A1* | 11/2014 | Nakanishi | B60P 1/045 348/148 |
| 2014/0367189 A1* | 12/2014 | Minoshima | B62D 5/06 180/422 |
| 2015/0084397 A1* | 3/2015 | Kudo | B60B 27/0015 301/6.5 |
| 2015/0298577 A1* | 10/2015 | Kobayashi | B60L 15/20 701/22 |
| 2016/0009183 A1* | 1/2016 | Levaray | B60L 3/0092 290/45 |
| 2016/0016512 A1* | 1/2016 | Masutani | B60R 1/00 340/435 |
| 2016/0229295 A1* | 8/2016 | Hoffmann | B60K 6/22 |
| 2016/0236616 A1* | 8/2016 | Kurihara | G06K 9/00805 |
| 2016/0300405 A1* | 10/2016 | Asada | G07C 5/085 |
| 2017/0015322 A1* | 1/2017 | Saito | B60W 10/20 |
| 2017/0015352 A1* | 1/2017 | Uranaka | B62D 21/11 |
| 2017/0066480 A1* | 3/2017 | Uranaka | B62D 21/17 |
| 2017/0259740 A1* | 9/2017 | Tsutsumi | H04N 7/183 |
| 2018/0037257 A1* | 2/2018 | Ichinose | B62D 5/0463 |
| 2018/0251033 A1* | 9/2018 | Tsutsumi | B60L 5/04 |
| 2018/0252278 A1* | 9/2018 | Naitou | F16D 55/40 |
| 2018/0354473 A1* | 12/2018 | Naitou | B60K 11/06 |
| 2019/0061763 A1* | 2/2019 | Takeda | B60T 1/10 |
| 2020/0009955 A1* | 1/2020 | Nakamura | B60K 1/00 |
| 2020/0016973 A1* | 1/2020 | Hagihara | B60K 7/0007 |
| 2020/0249035 A1* | 8/2020 | Gitz | G01C 21/3407 |
| 2020/0259143 A1* | 8/2020 | Sloan | B60L 53/80 |
| 2020/0335840 A1* | 10/2020 | Sloan | H01M 10/6556 |
| 2021/0122227 A1* | 4/2021 | Bindl | B60T 1/062 |
| 2021/0229583 A1* | 7/2021 | Li | B60K 1/00 |

FOREIGN PATENT DOCUMENTS

| | | |
|---|---|---|
| CN | 204222827 U | 3/2015 |
| JP | 2013129391 A | 7/2013 |

* cited by examiner

ELECTRIC MINING DUMP TRUCK

CROSS REFERENCE OF RELATED APPLICATIONS

This application is based on International Application No. PCT/CN2017/083651, filed on May 9, 2017, which claims priority to China Patent Application No. 201610496246, filed on Jun. 29, 2016, which are incorporated herein by reference in their entireties.

FIELD

The present disclosure relates to the field of mining dump trucks.

BACKGROUND

A mining dump truck is a vehicle that unloads cargo through hydraulic or mechanical lifting, and is usually used in mines or pits of poor road conditions. Mining dump trucks may also be referred to as tippers. Existing mining dump trucks mainly include mechanical wheel dump trucks and electric wheel dump trucks. An electric wheel dump truck consists of a frame, an engine, an electric generator, an electric wheel, an electric control system, a hydraulic lifting mechanism, a bed, a cab, and the like. The cab controls movement of the truck, the engine drives the electric generator to generate electricity, and the electricity generated by the electric generator is rectified and then supplied to the electric control system and the electric wheel. In addition, the engine serves as a power source for the hydraulic lifting mechanism and the like. The hydraulic lifting mechanism provides power for the bed. The electric control system controls actions of the hydraulic lifting mechanism, the engine, the electric generator, and the electric wheel. The electric wheel is usually air cooled.

However, the foregoing electric wheel dump truck system is excessively complicated, and maintenance costs are high. In addition, an engine used for a mine electric wheel dump truck needs a large displacement, that is, needs to consume a large amount of diesel and discharges a large amount of pollutants. Moreover, the engine generates loud noise, severely affecting health of a driver and people in a workplace.

SUMMARY

To resolve the problem that an existing electric wheel dump truck system is excessively complicated, has high maintenance costs and causes noise pollution to the environment and personnel, the present disclosure provides an electric mining dump truck.

The electric mining dump truck provided according to the present disclosure includes a frame, an axle, an electric wheel assembly, a power battery assembly, an electric control system, a hydraulic system, a cooling system, a bed and a cab assembly, where the cab assembly is disposed on a front end of the frame; the bed is mounted on a rear end of the frame;

the axle includes a front axle and a rear axle, the front axle and the rear axle is mounted on the front end and the rear end of the frame, respectively, the electric wheel assembly is mounted on the rear axle;

the power battery assembly includes a battery cabinet configured to supply electric energy to various electric components;

the electric control system is configured to control the electric wheel assembly, the power battery assembly, the hydraulic system and the cooling system; the hydraulic system is configured to provide hydraulic oil for various types of hydraulic apparatuses; and the cooling system is configured to cool various heat generation and heat transfer components.

By means of the electric mining dump truck provided according to the present disclosure, a weight of the power battery assembly of the electric mining dump truck is the same as a weight of the engine and the electric generator of the conventional electric wheel dump truck, and electrification is realized with the curb weight of the truck substantially unchanged, so that a power system and an electric control system of the truck are significantly simplified, and maintenance is more convenient. Thus, noise pollution and emission pollution are greatly reduced, and comfort of a driver's working environment is improved. Compared with the conventional electric wheel dump truck, the electric mining dump truck does not consume excessive fuel. Because electricity costs much less than oil, using a pure electric dump truck can reduce operating costs of mine, and bring quite considerable economic benefits.

Further, the frame is a box-girder frame which includes two longitudinal beams disposed on both sides, and the battery cabinet includes a frame battery cabinet mounted on the frame, a supporting and fixing structure for fixedly mounting the frame battery cabinet is provided on the two longitudinal beams.

Further, the supporting and fixing structure includes saddles symmetrically disposed over the two longitudinal beams and brackets disposed underneath the two longitudinal beams, at least a portion of the frame battery cabinet is supported and fixed in space between the two longitudinal beams by means of the saddles and the brackets. Such supporting and fixing structure of the battery cabinet not only meets a structural strength requirement, but also saves internal space of the frame as much as possible, so that more batteries can be arranged on the truck to increase an endurance mileage. In addition, a large battery cabinet can facilitate assembly and disassembly. The battery cabinet is located in the middle of the box-girder frame to prevent impact to the batteries. This significantly improves safety of the battery cabinet. In addition, the battery cabinet is in a relatively low location, thereby lowering a center of gravity of the truck while meeting a ground clearance. Moreover, a ratio of front axle load to rear axle load is close to 50%:50% in a case of no load, and therefore the truck runs more smoothly.

Further, the frame battery cabinet includes a first battery cabinet and the second battery cabinet; the supporting and fixing structure includes a first supporting and fixing structure and a second supporting and fixing structure that are disposed in a front-to-rear direction of the truck; where the first supporting and fixing structure includes a first saddle symmetrically disposed over the two longitudinal beams and a first bracket disposed underneath the two longitudinal beams, the first battery cabinet is fixed on the first saddle and the first bracket; the second supporting and fixing structure includes a second saddle symmetrically disposed over the two longitudinal beams and a second bracket disposed underneath the two longitudinal beams, the second battery cabinet is fixed on the second saddle and the second bracket.

Further, mounting holes are provided on all of the frame battery cabinet, the brackets and the saddles, the frame battery cabinet is connected in a fixed fashion to the brackets and the saddles through mating of bolts and the mounting holes; where rubber cushions are further mounted between the brackets and the frame battery cabinet and between the saddles and the frame battery cabinet. The rubber cushion can further reduce an impact on the battery cabinet during running of the truck.

Further, an operating platform is provided on the electric mining dump truck, the cab assembly is mounted on a left side of the operating platform; and the electric control system is integrated in an electric control cabinet, the battery cabinet further including a platform battery cabinet mounted on the operating platform, the platform battery cabinet including a third battery cabinet, the third battery cabinet and the electric control cabinet is mounted on the operating platform.

Further, the hydraulic system includes a first drive motor, a second drive motor, a single vane pump, a double vane pump, a plunger pump, a lifting hydraulic cylinder, a steering cylinder, and an energy accumulator; the single vane pump is driven by the first drive motor, and a hydraulic oil outlet of the single vane pump is communicated to the lifting hydraulic cylinder through a pipe;

the double vane pump and the plunger pump are connected in series, both are driven by the second drive motor, a hydraulic oil outlet of the plunger pump is connected to the steering cylinder and the energy accumulator, respectively. In this hydraulic system, the first drive motor independently drives the single vane pump, and the second drive motor independently drives the double vane pump and the plunger pump, to provide power through hydraulic steering, braking, and lifting. A drive mechanism between an engine and a hydraulic pump of a conventional electric wheel dump truck is removed, and drive efficiency is improved, so that working of the hydraulic pump can be more precisely controlled, and in addition, arrangement of the motor facilitates mounting and maintenance. Compared with that the engine drives the hydraulic pump on the conventional electric wheel dump truck, precise control of hydraulic steering, braking, and lifting of the motor-driven hydraulic pump according to the present disclosure is easier to implement. In addition, it is ensured that steering, braking, and lifting are not affected by each other.

Further, the cooling system includes a hydraulic oil cooling system, a hydraulic drive motor cooling system, an electric wheel cooling system, and a battery air conditioning electric control cabinet cooling system.

Further, the electric wheel cooling system includes a right electric wheel cooling subsystem mounted on a right side of the rear axle for cooling a right electric wheel, and a left electric wheel cooling subsystem mounted on a left side of the rear axle for cooling a left electric wheel; the right electric wheel cooling subsystem includes an oil filter, an oil pump motor, a heat exchanger, a high pressure water pump, and a right heat sink; the high pressure water pump is disposed between the right heat sink and the heat exchanger, and the right heat sink, the high pressure water pump, and the heat exchanger forming a cooling water loop; the oil pump motor and the oil filter are disposed between the heat exchanger and the right electric wheel, and the heat exchanger, the oil pump motor, the oil filter and the right electric wheel forming a cooling oil loop; the left electric wheel cooling subsystem includes an oil filter, an oil pump motor, a heat exchanger, a high pressure water pump, and a left heat sink; the high pressure water pump is disposed between the left heat sink and the heat exchanger, and the left heat sink, the high pressure water pump and the heat exchanger forming a cooling water loop; and the oil pump motor and the oil filter are disposed between the heat exchanger and the left electric wheel, the heat exchanger, the oil pump motor, the oil filter and the left electric wheel forming a cooling oil loop.

The electric wheel cooling system has high cooling efficiency, and enables the truck to have high space utilization when arranged on the truck. The left electric wheel cooling subsystem and the right electric wheel cooling subsystem are independent of each other, and therefore safety of the left electric wheel and the right electric wheel during long-time driving at a suitable temperature is better ensured. The electric wheel cooling system has higher space utilization, a better cooling effect, and is easier to be controlled, so that the electric wheel has a longer life.

Further, the oil filters, the oil pump motors, and the heat exchangers in the right electric wheel cooling subsystem and the left electric wheel cooling subsystem are symmetrically arranged inside the frame; the oil filter and heat exchanger can connect to a pipeline of the electric wheel in a convenient way, helping protect a product in a harsh mine environment, and the left heat sink and the right heat sink are symmetrically suspended on a lower part of the front end of the truck. The electric wheel cooling system allows for a large surface in contact with air, and is convenient to mount and maintain, and has a more aesthetic appearance.

Figure 1:
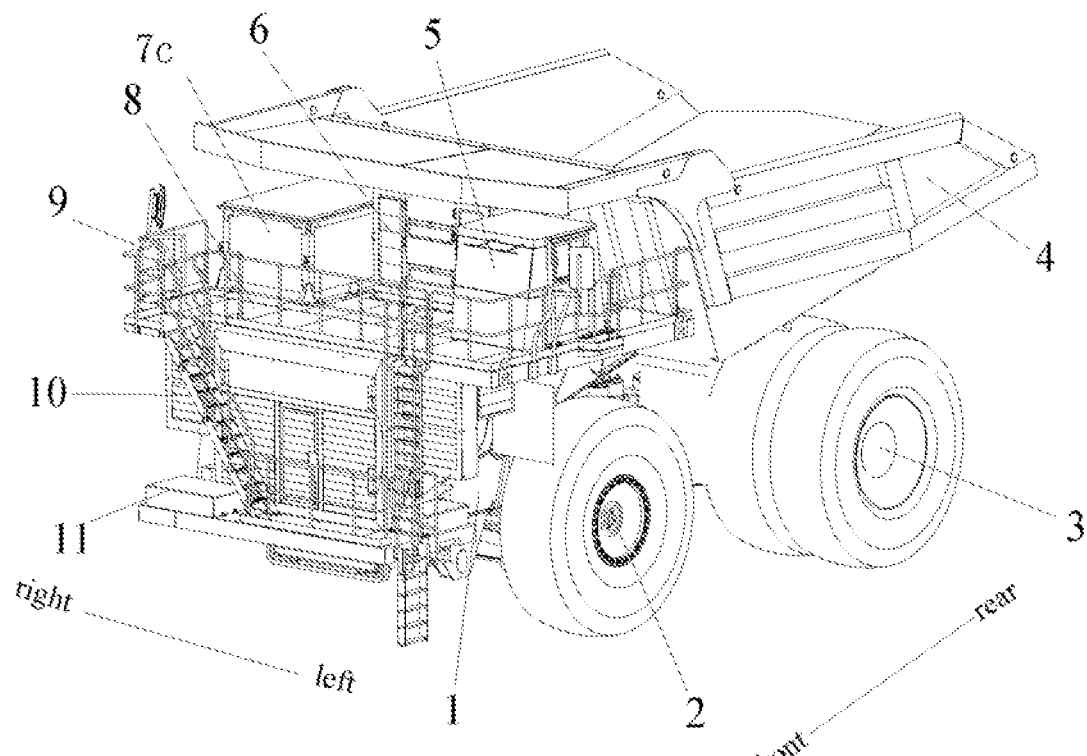
FIG. 1 is a schematic perspective view of an electric mining dump truck in accordance with the present disclosure.

In the drawings, 1. Frame; 2. Front axle; 3. Rear axle; 4. Bed; 5. Cab assembly; 6. Electric control cabinet; 7. Battery cabinet; 8. Operating platform; 9. Ladder; 10. Heat sink; 11. Charging interface; 1a. First saddle; 1b. Second saddle; 1c. First bracket; 1d. Second bracket; 1e. Single vane pump; 1f. Double vane pump; 1g. Plunger pump; 1h. First drive motor; 1j. Second drive motor; 1k. Longitudinal beam; 7a. First battery cabinet; 7b. Second battery cabinet; 7c. Third battery cabinet; 3a. Right electric wheel; 3b. Left electric wheel; 10a. Right heat sink; 10b. High pressure water pump; 10c. Heat exchanger; 10d. Oil pump motor; 10e. Oil filter; 10g. Left heat sink.

DETAILED DESCRIPTION

To make the technical problems to be solved by the present disclosure, technical solutions, and beneficial effects more comprehensible, the following further describes the present disclosure in detail with reference to the accompanying drawings and embodiments. It should be understood that specific embodiments described herein are merely used for explaining the present disclosure, but not used for limiting the present disclosure.

The following illustrates in detail an electric mining dump truck provided according to the present with reference to embodiments. As shown in FIG. 1, the electric mining dump truck includes a frame 1, an axle, an electric wheel assembly, a power battery assembly, an electric control system, a hydraulic system, a cooling system, a bed 4, and a cab assembly 5.

The cab assembly 5 is disposed on a front end of the frame 1. The bed 4 is mounted on a rear end of the frame 1. The axle includes a front axle 2 and a rear axle 3. The front axle 2 is mounted on the front end of the frame 1, and the rear axle 3 is mounted on the rear end of the frame 1. The electric wheel assembly is mounted on the rear axle 3.

The power battery assembly includes a battery cabinet configured to supply electric energy to various electric components. The battery cabinet may include a frame battery cabinet mounted on the frame 1. The "electric component" described herein is any apparatus that requires electric energy, including the foregoing electric wheel assembly, electric control system, hydraulic system, cooling system, cab assembly 5, and the like.

The electric control system is configured to control the electric wheel assembly, the hydraulic system, and the cooling system. The hydraulic system is configured to provide hydraulic oil for various hydraulic apparatuses. The cooling system is configured to cool various heat generation and heat transfer components. The so-called hydraulic apparatus includes various hydraulic pumps, hydraulic cylinders, accumulators, and the like powered by means of hydraulic oil, such as a single vane pump 1e, a double vane pump 1f, a plunger pump 1g, a lifting hydraulic cylinder, a steering cylinder, an energy accumulator, and the like in the following text. For the purpose of this disclosure, the heat generation/heat transfer component refers to various structures that generate heat or transfer heat during use and need to be cooled to ensure normal operation of the structures. Examples of heat generation/heat transfer component include the electric wheel assembly, the hydraulic system through which hydraulic oil flows, a motor that drives the hydraulic pump, a battery, an electric control cabinet 6, the cab assembly 5, and the like in the following text.

Compared with a conventional electric wheel dump truck, the electric mining dump truck provided according to the present disclosure is mainly different in that the electric mining dump truck uses a power battery assembly to replace an engine and an electric generator. Because the electric mining dump truck does not have an engine, a pump in the hydraulic system needs to be replaced with a motor-driven hydraulic pump.

Figure 2:
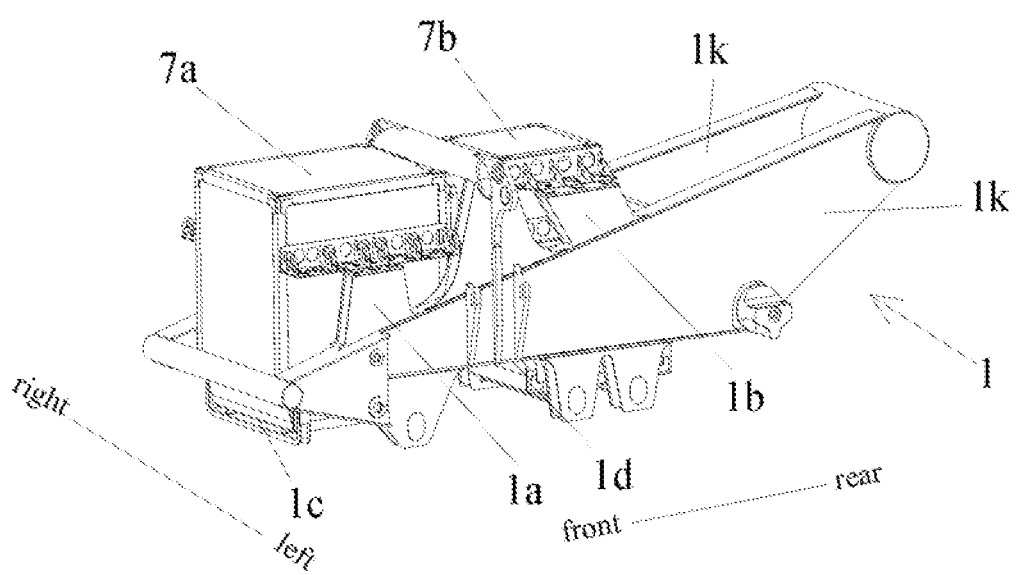
FIG. 2 is a schematic perspective view of a battery cabinet mounted on a frame in accordance with the present disclosure.
Figure 3:
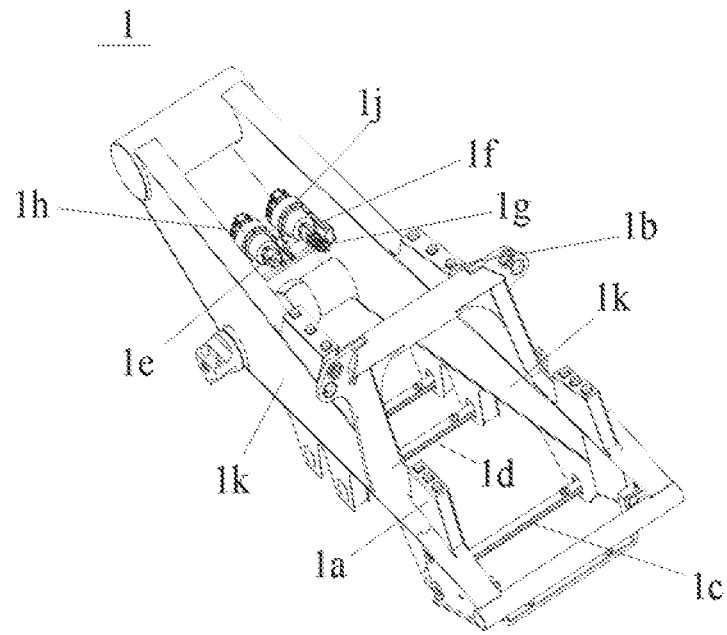
FIG. 3 is a schematic perspective view of a hydraulic system mounted on a frame in accordance with the present disclosure.

The frame 1 is a box-girder frame shown in FIG. 1 to FIG. 3, and includes two longitudinal beams 1k disposed on left and right sides. Each longitudinal beam 1k is generally a triangular metal plate component, and a supporting and fixing structure for fixedly mounting the frame battery cabinet is provided on the two longitudinal beams 1k. The supporting and fixing structure not only supports the frame battery cabinet, but also prevents the frame battery cabinet to prevent the frame battery cabinet from swaying in a front, rear, left or right direction. Conventional structures the frame battery cabinets, such as those used for mounting battery cabinets electric cars or electric buses may be employed.

Specifically, as shown in FIG. 2 and FIG. 3, the supporting and fixing structure includes saddles symmetrically disposed over the two longitudinal beams 1k and brackets disposed underneath the two longitudinal beams 1k. At least a portion of the frame battery cabinet is supported and fixed between the two longitudinal beams 1k by means of the saddles and the brackets. As used herein the phrase "at least a portion" may be used to describe a situation such as where the power battery assembly includes a plurality of battery cabinets, and there is not enough space on the frame 1 to mount all the battery cabinets, so additional battery cabinets need to be mounted on other locations. The supporting and fixing structure of the frame battery cabinet not only meets a structural strength requirement, but also saves internal space of the frame 1, so that additional batteries can be arranged on the truck to increase the trucks range or mileage. In addition, a large frame battery cabinet can facilitate assembly and disassembly. The frame battery cabinet is located in the middle of the box-girder frame 1 to prevent impact to the batteries. This significantly improves safety of the frame battery cabinet. In addition, the frame battery cabinet is in a relatively low location, thereby lowering a center of gravity of the truck while meeting a ground clearance. Moreover, a ratio of front axle load to rear axle load is close to 50%:50% in a case of no load, and therefore the truck runs more smoothly.

A quantity of frame battery cabinets is not particularly limited, and depends on power required for truck overall and a size of the frame battery cabinet. In an embodiment, the frame battery cabinet includes a first battery cabinet 7a and the second battery cabinet 7b.

The supporting and fixing structure includes a first supporting and fixing structure and a second supporting and fixing structure that are disposed in a front-to-rear direction of the truck.

The first supporting and fixing structure includes a first saddle 1a symmetrically-disposed over the two longitudinal beams 1k and a first bracket 1c disposed underneath the two longitudinal beams 1k, and the first battery cabinet 7a is fixed on the first saddle 1a and the first bracket 1c.

The second supporting and fixing structure includes a second saddle 1b symmetrically disposed over the two longitudinal beams 1k and a second bracket 1d disposed underneath the two longitudinal beams 1k, and the second battery cabinet 7b is fixed on the second saddle 1b and the second bracket 1d.

In an embodiment, mounting holes are provided on all of the frame battery cabinet, the brackets, and the saddles (not marked in the figure), and the frame battery cabinet is connected in a fixed fashion to the brackets and the saddles through mating of bolts and the mounting holes.

In an embodiment, rubber cushions are further mounted between the brackets and the frame battery cabinet and between the saddles and the frame battery cabinet. The rubber cushion can further reduce an impact on the frame battery cabinet during running of the truck.

In an embodiment, the electric mining dump truck is further provided with an operating platform 8, and the cab assembly 5 is mounted on a left side of the operating platform 8. The battery cabinet may include a platform battery cabinet mounted on the operating platform 8.

The electric control system is integrated in the electric control cabinet 6, the platform battery cabinet includes a third battery cabinet 7c, and the third battery cabinet 7c and the electric control cabinet 6 are mounted on the operating platform 8. Specifically, the third battery cabinet 7c is mounted on a right side of the operating platform 8, and the electric control cabinet 6 is mounted on an intermediate location of the operating platform 8, that is, located between the cab assembly 5 and the third battery cabinet 7c.

A charging interface 11 is further mounted at a lower location on the frame 1, and the battery cabinet 7 is charged through the charging interface 11. In an embodiment, the power battery assembly consists of three battery cabinets, to ensure an endurance mileage of the truck. The first battery cabinet 7a and the second battery cabinet 7b are arranged between the two longitudinal beams 1k of the frame 1. The first battery cabinet 7a is disposed on a front location, and the second battery cabinet 7b is disposed on a rear position, effectively balancing an axle load ratio of the truck. In addition, the locations of the first battery cabinet 7a and the second battery cabinet 7b are relatively low relative to a height of such type of truck, and therefore stability of the truck can be significantly improved during running. The third battery cabinet 7c is arranged on the right side of the operating platform 8, to facilitate for mounting and maintenance, while effectively balancing a ratio of left and right wheel load of the truck.

Because the cab assembly of the electric mining dump truck is mounted on a relatively high location, a ladder having a guardrail is further mounted, to facilitate driver's access to the cab assembly located on the operating platform 8. A lower end of the escalator is close to ground, so that it can be convenient for a driver to go from a lower location to the operating platform 8 through the ladder.

According to the present disclosure, as shown in FIG. 3, the hydraulic system includes a first drive motor 1h, a second drive motor 1j, a single vane pump 1e, a double vane pump 1f, a plunger pump 1g, a lifting hydraulic cylinder, a steering cylinder, and an energy accumulator.

The single vane pump 1e is driven by the first drive motor 1h, and a hydraulic oil outlet of the single vane pump is communicated to the lifting hydraulic cylinder through a pipe. The lifting hydraulic cylinder controls a lifting action of the bed 4.

The double vane pump 1f and the plunger pump 1g are connected in series, and are driven by the second drive motor 1j, and a hydraulic oil outlet of the plunger pump 1g is connected to the steering cylinder and the energy accumulator. In the hydraulic system, the first drive motor 1h independently drives the single vane pump 1e, and the second drive motor 1j independently drives the double vane pump 1f and the plunger pump 1g, to provide power through hydraulic steering, braking, and lifting. A drive mechanism between an engine and a hydraulic pump of a conventional electric wheel dump truck is removed, and drive efficiency is improved, so that working of the hydraulic pump can be more precisely controlled, and in addition, arrangement of the motor facilitates mounting and maintenance. Compared with that the engine drives the hydraulic pump on the conventional electric wheel dump truck, precise control of hydraulic steering, braking, and lifting of the motor-driven hydraulic pump in this embodiment is easier to implement, and in addition, it is ensured that steering, braking, and lifting are not affected by each other. The first drive motor 1h and the second drive motor 1j are mounted inside the frame 1 through a bell-shaped cover and a hydraulic pump. Compared with that three hydraulic pumps are driven by power from an engine in the conventional electric wheel dump truck, a connection between the motor and the hydraulic pump is convenient and reliable, a drive structure is simple, and it is easier to control a working status of the hydraulic pump in real time by controlling the motor.

In an embodiment, the cooling system includes a hydraulic oil cooling system, a hydraulic drive motor cooling system, an electric wheel cooling system, and a battery air conditioning electric control cabinet cooling system.

The hydraulic oil cooling system is configured to cool heated hydraulic oil, and mainly include a heat sink 10 mounted on the right side of the operating platform 8. The heat sink 10 is suspended on the right side of the operating platform 8, and has a good ventilation effect and high cooling efficiency. The hydraulic drive motor cooling system and the battery air conditioning electric control cabinet cooling system use a water-cooling method, and mainly consist of a water tank, the heat sink 10, and a water pump. The foregoing hydraulic oil cooling system, hydraulic drive motor cooling system, and battery air conditioning electric control cabinet cooling system can be designed in a way the same as a conventional vehicle without any particular limitation.

Figure 4:
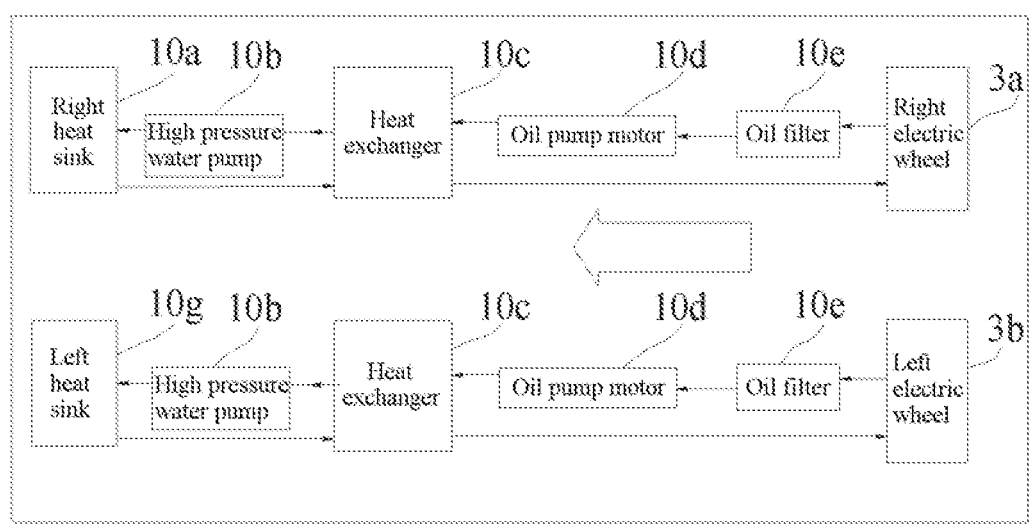
FIG. 4 is a schematic diagram of an electric wheel cooling system in accordance with the present disclosure.

In an embodiment, as shown in FIG. 4, the electric wheel cooling system includes a right electric wheel cooling subsystem that is used to cool a right electric wheel 3a and that is mounted on a right side of the rear axle 3, and a left electric wheel cooling subsystem that is used to cool a left electric wheel 3b and that is mounted on a left side of the rear axle 3. An upper loop is the right electric wheel cooling subsystem, and a lower loop is the left electric wheel cooling subsystem. A direction indicated by an arrow in the figure is a direction in which the truck is heading.

The right electric wheel cooling subsystem includes an oil filter 10e, an oil pump motor 10d, a heat exchanger 10c, a high pressure water pump 10b, and a right heat sink 10a. The high pressure water pump 10b is disposed between the right heat sink 10a and the heat exchanger 10c, and the right heat sink 10a, the high pressure water pump 10b, and the heat exchanger 10c form a cooling water loop. The oil pump motor 10d and the oil filter 10e are disposed between the heat exchanger 10c and the right electric wheel 3a, and the heat exchanger 10c, the oil pump motor 10d, the oil filter 10e, and the right electric wheel 3a form a cooling oil loop.

The left electric wheel cooling subsystem includes an oil filter 10e, an oil pump motor 10d, a heat exchanger 10c, a high pressure water pump 10b, and a left heat sink 10g. The high pressure water pump 10b is disposed between the left heat sink 10g and the heat exchanger 10c, and the left heat sink 10g, the high pressure water pump 10b, and the heat exchanger 10c form a cooling water loop. The oil pump motor 10d and the oil filter 10e are disposed between the heat exchanger 10c and the left electric wheel 3b, and the heat exchanger 10c, the oil pump motor 10d, the oil filter 10e, and the left electric wheel 3b form a cooling oil loop.

The foregoing right electric wheel cooling subsystem and the left electric wheel cooling subsystem may be independent of each other. The right electric wheel cooling subsystem and the left electric wheel cooling subsystem may independently use the high pressure water pump 10b, the heat exchanger 10c, the oil pump motor 10d, and the oil filter 10e, or may jointly use the high pressure water pump 10b, the heat exchanger 10c, the oil pump motor 10d, and the oil filter 10e. In an embodiment, the right electric wheel cooling subsystem and the left electric wheel cooling subsystem are independent of each other according to the foregoing mode.

A working principle of the electric wheel cooling system is as follows: high-temperature coolant oil from an electric wheel first passes through the oil filter 10e, and then arrives at the heat exchanger 10c (or referred to as an oil cooler) after passing through the oil pump motor 10d; heat is exchanged between the high-temperature coolant oil and cooling water in the heat exchanger 10c, cooled coolant oil returns to the electric wheel to cool the motor, and the cooling water with heat of the coolant oil is dissipated by means of the foregoing left heat sink 10g and right heat sink 10a, and then returns to the heat exchanger 10c through respective high-pressure water pumps 10b, to take in heat of coolant oil again, and so on.

The electric wheel cooling system has high cooling efficiency, and enables the truck to have high space utilization when arranged on the truck. The left electric wheel cooling subsystem and the right electric wheel cooling subsystem are independent of each other, and therefore safety of the left electric wheel and the right electric wheel during long-time driving at a suitable temperature is better ensured. The electric wheel cooling system has higher space utilization, a better cooling effect, and is easier to be controlled, so that the electric wheel has a longer life.

Further, the oil filters, the oil pump motors, and the heat exchangers in the right electric wheel cooling subsystem and the left electric wheel cooling subsystem are symmetrically arranged inside the frame 1. The oil filter and heat exchanger can connect to a pipeline of the electric wheel in a convenient way, helping protect a product in a harsh mine environment, and the left heat sink and the right heat sink are symmetrically suspended on a lower part of the front end of the truck. The electric wheel cooling system allows for a large surface for contact with air, is convenient to mount and maintain, and has a more aesthetic appearance.

The electric mining dump truck provided according to the present disclosure replaces the conventional mining dump truck in real sense, implements energy conservation and emission reduction of a mine, improves the economic benefit of a mine, and is a great technological innovation of the mining dump truck.

By means of the electric mining dump truck provided according to the present disclosure, a weight of the power battery assembly of the electric mining dump truck is the same as a weight of the engine and the electric generator of the conventional electric wheel dump truck, and electrification is realized with the curb weight of the truck substantially unchanged, so that a power system and an electric control system of the truck are significantly simplified, and maintenance is more convenient. Thus, noise pollution and emission pollution are greatly reduced, and comfort of a driver's working environment is improved. Compared with the conventional electric wheel dump truck, the electric mining dump truck does not consume excessive fuel. Because electricity costs much less than oil, using a pure electric dump truck can reduce operating costs of mine, and bring quite considerable economic benefits.

The foregoing descriptions are merely preferred embodiments of the present disclosure, but are not intended to limit the present disclosure. Any modification, equivalent replacement, or improvement made without departing from the spirit and principle of the present disclosure should fall within the scope of the present disclosure.

What is claimed is:

1. An electric mining dump truck, comprising a frame, an axle, an electric wheel assembly, a power battery assembly, an electric control system, a hydraulic system, a cooling system, a bed and a cab assembly, wherein
   the cab assembly is disposed on a front end of the frame;
   the bed is mounted on a rear end of the frame;
   the axle includes a front axle and a rear axle, the front axle and the rear axle is mounted on the front end and the rear end of the frame, respectively, the electric wheel assembly is mounted on the rear axle;
   the power battery assembly comprises a battery cabinet configured to supply electric energy to various electric components; and
   the electric control system is configured to control the electric wheel assembly, the power battery assembly, the hydraulic system and the cooling system; the hydraulic system is configured to provide hydraulic oil for various types of hydraulic apparatuses; and the cooling system is configured to cool various heat generation and heat transfer components,
   wherein the frame is a box-girder frame which comprises two longitudinal beams disposed on both sides, and the battery cabinet comprises a frame battery cabinet mounted on the frame, a supporting and fixing structure for fixedly mounting the frame battery cabinet is provided on the two longitudinal beams,
   wherein the supporting and fixing structure comprises saddles symmetrically disposed over the two longitudinal beams and brackets disposed underneath the two longitudinal beams, and at least a portion of the frame battery cabinet is supported and fixed in space between the two longitudinal beams by the saddles and the brackets.

2. The electric mining dump truck according to claim 1, wherein the frame battery cabinet comprises a first battery cabinet and a second battery cabinet;
   the supporting and fixing structure comprises a first supporting and fixing structure and a second supporting and fixing structure that are disposed in a front-to-rear direction of the truck; wherein
   the first supporting and fixing structure comprises a first saddle symmetrically disposed over the two longitudinal beams and a first bracket disposed underneath the two longitudinal beams, the first battery cabinet is fixed on the first saddle and the first bracket; and
   the second supporting and fixing structure comprises a second saddle symmetrically disposed over the two longitudinal beams and a second bracket disposed underneath the two longitudinal beams, and the second battery cabinet is fixed on the second saddle and the second bracket.

3. The electric mining dump truck according to claim 1, wherein mounting holes are provided on all of the frame battery cabinet, the brackets and the saddles, the frame battery cabinet are connected in a fixed fashion to the brackets and the saddles through mating of bolts and the mounting holes; wherein
   rubber cushions are further mounted between the brackets and the frame battery cabinet and between the saddles and the frame battery cabinet.

4. The electric mining dump truck according to claim 2, wherein an operating platform is provided on the electric mining dump truck, the cab assembly is mounted on a left side of the operating platform, the battery cabinet further comprising a platform battery cabinet mounted on the operating platform; and
   the electric control system is integrated in an electric control cabinet, the platform battery cabinet comprising a third battery cabinet, and the third battery cabinet and the electric control cabinet is mounted on the operating platform.

5. The electric mining dump truck according to claim 1, wherein the hydraulic system comprises a first drive motor, a second drive motor, a single vane pump, a double vane pump, a plunger pump, a lifting hydraulic cylinder, a steering cylinder and an energy accumulator; wherein
   the single vane pump is driven by the first drive motor, a hydraulic oil outlet of the single vane pump is communicated to the lifting hydraulic cylinder through a pipe; and
   the double vane pump and the plunger pump are connected in series, both are driven by the second drive motor, and a hydraulic oil outlet of the plunger pump is connected to the steering cylinder and the energy accumulator, respectively.

6. The electric mining dump truck according to claim 1, wherein the cooling system comprises a hydraulic oil cooling system, a hydraulic drive motor cooling system, an electric wheel cooling system and a battery air conditioning electric control cabinet cooling system.

7. The electric mining dump truck according to claim 6, wherein the electric wheel cooling system comprises a right electric wheel cooling subsystem mounted on a right side of the rear axle for cooling a right electric wheel, and a left electric wheel cooling subsystem mounted on a left side of the rear axle for cooling a left electric wheel; wherein the right electric wheel cooling subsystem comprises an oil filter, an oil pump motor, a heat exchanger, a high pressure water pump and a right heat sink;

the high pressure water pump is disposed between the right heat sink and the heat exchanger, the right heat sink, the high pressure water pump and the heat exchanger forming a cooling water loop;

the oil pump motor and the oil filter are disposed between the heat exchanger and the right electric wheel, the heat exchanger, the oil pump motor, the oil filter and the right electric wheel forming a cooling oil loop;

the left electric wheel cooling subsystem comprises an oil filter, an oil pump motor, a heat exchanger, a high pressure water pump, and a left heat sink;

the high pressure water pump is disposed between the left heat sink and the heat exchanger, the left heat sink, the high pressure water pump and the heat exchanger forming a cooling water loop; and the oil pump motor and the oil filter are disposed between the heat exchanger and the left electric wheel, the heat exchanger, the oil pump motor, the oil filter and the left electric wheel forming a cooling oil loop.

8. The electric mining dump truck according to claim 7, wherein the oil filters, the oil pump motors and the heat exchangers in the right electric wheel cooling subsystem and the left electric wheel cooling subsystem are symmetrically arranged inside the frame; and the left heat sink and the right heat sink are symmetrically suspended on a lower portion of a front end of the truck.

\* \* \* \* \*